July 8, 1924.
B. H. HOWARD ET AL
FEEDER FOR INGOT MOLDS
Filed Dec. 29, 1923 — 3 Sheets-Sheet 1
1,500,734
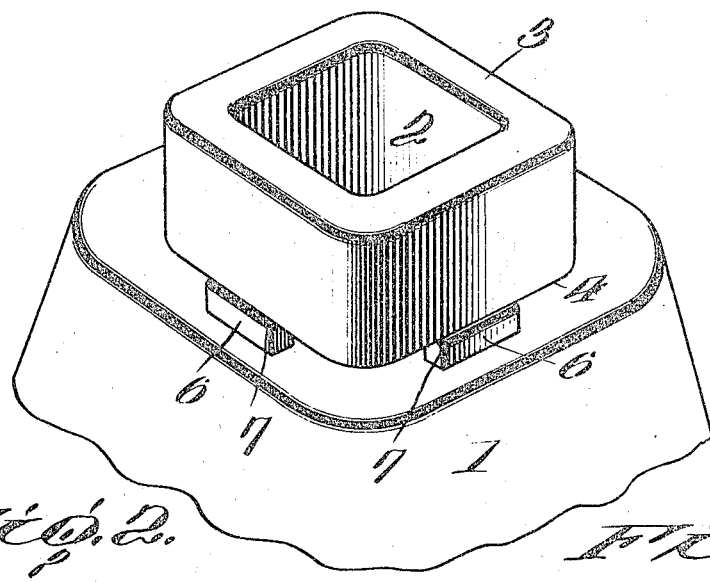
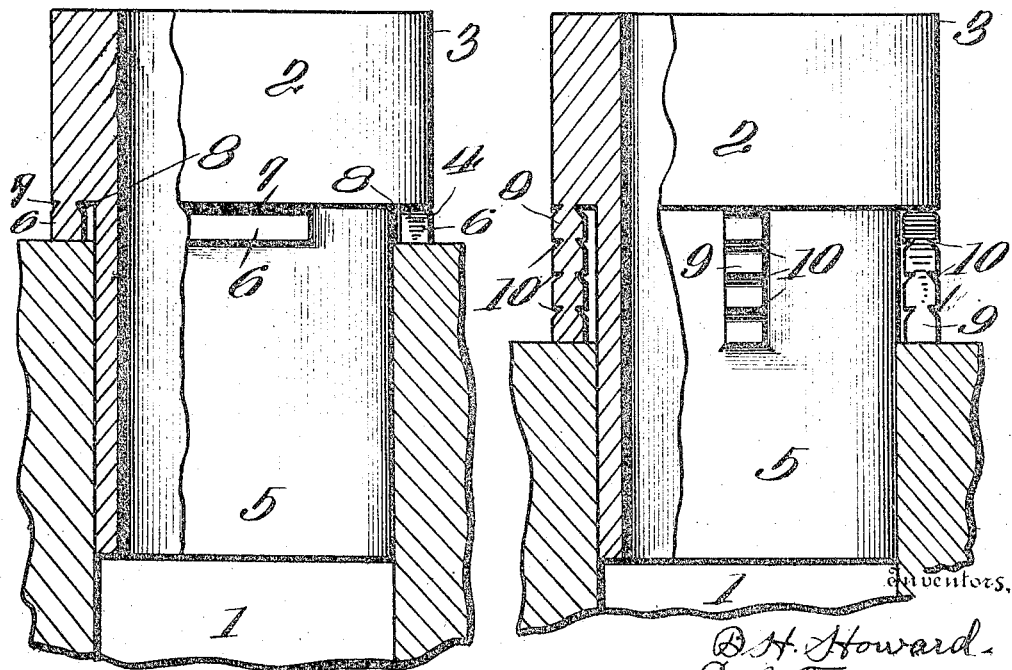
Inventors,
B. H. Howard
E. J. Turner
By C. R. Wright Jr., Attorney July 8, 1924.
B. H. HOWARD ET AL
FEEDER FOR INGOT MOLDS
Filed Dec. 29, 1923
1,500,734
3 Sheets-Sheet 2
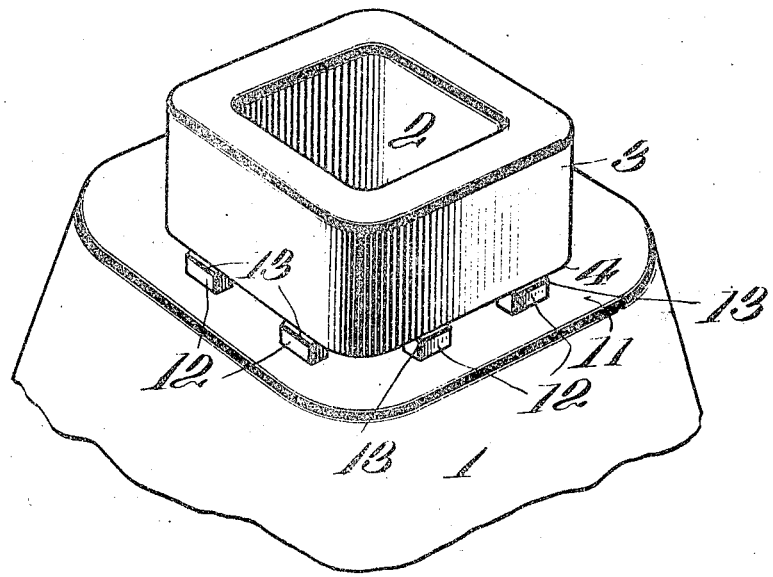
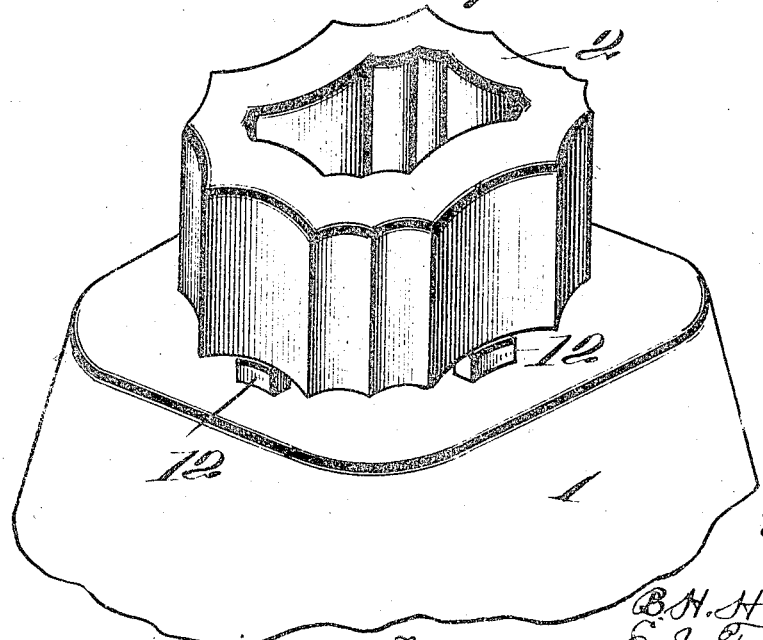

July 8, 1924.
B. H. HOWARD ET AL
1,500,734
FEEDER FOR INGOT MOLDS
Filed Dec. 29, 1923　　3 Sheets-Sheet 3
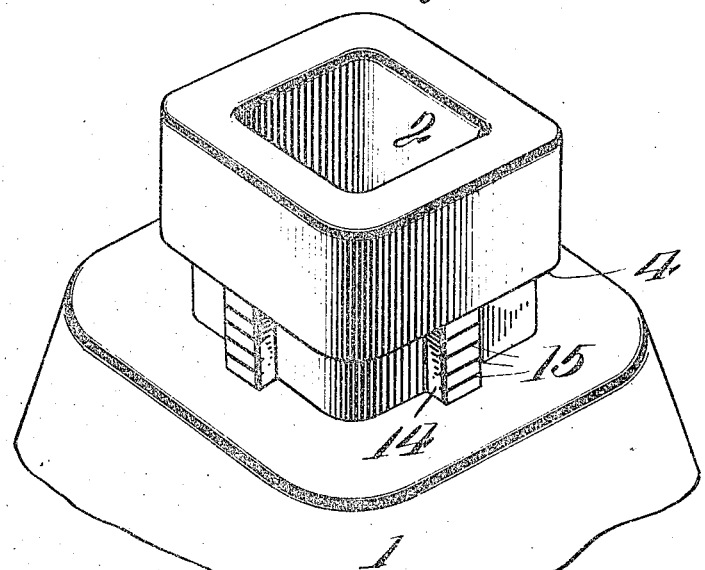
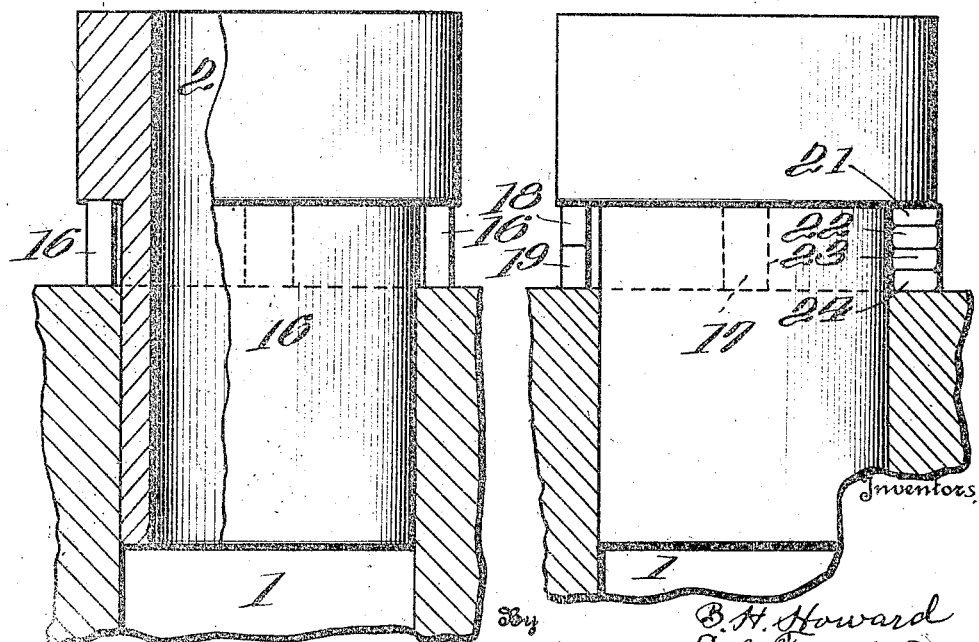

Patented July 8, 1924.

1,500,734

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 29, 1923. Serial No. 683,499.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds having means whereby it can be lowered a greater distance into the mold under certain conditions and whereby a more perfect ingot can be cast in the mold and which prevents " piping " and reduces " segregation " to a minimum.

Another object of our invention is to provide a feeder of this character which can be readily used on any of the well known forms of ingot molds and at the same time provide a simple, cheap and effective feeder having certain details of structure and combination of parts hereinafter more fully set forth.

In the accompanying drawings:

Figure 1 is a perspective view of an ingot mold showing our improved feeder applied thereto.

Figure 2 is a sectional view of the mold showing the feeder in the mold and partly in section.

Figure 3 is a view similar to Figure 2 showing a modified form of feeder.

Figure 4 is a perspective view of a mold showing a feeder embodying our invention applied thereto which has two short supports in each side instead of the one support as shown in Figures 1 and 2 of the drawings.

Figure 5 is a perspective view of an ingot mold showing a fluted feeder having the supports as embodied in the modification of Figure 4.

Figure 6 is a perspective view of a mold showing a feeder supported by bricks having scores so that a portion thereof may be broken off to lower the feeder in the mold.

Figure 7 shows the feeder supported on the mold by bricks arranged on end.

Figure 8 shows the feeder supported by bricks in which the bricks are arranged on end, also on edge and also on the side.

Referring now to the drawings 1 represents the mold and 2 the feeder. In this form of feeder the upper end is provided with an elongated annular flange 3 forming the shoulder 4 and the neck portion 5 which extends into the mold 1.

The shoulder 4 is provided on the four sides with a broad downwardly extending lug 6 which is spaced from the neck portion 5 as clearly shown in Figure 2 of the drawings. These lugs are scored as indicated at 7 and 8 on their outer and inner faces at the junction with the shoulder and whereby they may be broken off to lower the feeder into the mold the purpose of which is well understood by those skilled in the art.

In the modification shown in Figure 3 the lugs 9 are of a narrow form and of a length considerably greater than that shown in Figures 1 and 2 of the drawings. In this form the lugs having series of scores 10 whereby a portion of the lugs may be broken off to vary the distance the neck portion of the feeder extends into the upper end of the mold. Any number of these portions between the scores may be broken off as will be fully understood.

In the modification shown in Figure 4 instead of having the shoulder 4 provided with a single broad lug as shown in Figure 2 of the drawings we have provided two lugs 11 and 12 on each side of the feeder whereby the feeder will be held against any rocking motion in the mold and also allow the lugs to be readily broken off as they are scored as indicated at 13. While we have shown but a single score in this form of lug it will be understood that they may be of an elongated form such as shown in Figure 3 of the drawings and whereby any portion of the lug may be broken off. The same principle could also be applied to Figure 5.

In Figure 6 we have shown bricks 14 resting on the upper end of the mold and upon which the shoulder 4 of the feeder 2 rests. In this form the bricks 14 are scored as indicated at 16 so that they may be broken off to allow the feeder to enter a greater distance into the mold.

In Figure 7 we have shown the ordinary brick 16 arranged on end to support the feeder on the mold.

In Figure 8 we have shown a single brick 17 in dotted lines on end. We have also shown two bricks 18 and 19 on edge and at the opposite side we have shown four bricks 20, 21, 22 and 23 on the sides whereby the feeder is firmly supported on all sides.

Having thus fully described our invention what we claim is:—

1. A feeder for ingot molds comprising a body portion having a shoulder and lugs carried by said shoulder for supporting the feeder in the mold.

2. A feeder for ingot molds comprising a body portion having a shoulder and lugs carried by the said shoulder and adapted to be broken off whereby the feeder may be lowered into the mold.

3. A feeder for ingot molds comprising a body portion having a shoulder and breakable lugs carried by said shoulder and spaced from the wall of the mold.

4. A feeder for ingot molds comprising a body portion having a shoulder and lugs carried by the shoulder and spaced from the wall of the feeder and scored whereby they may be broken off.

5. A feeder for ingot molds comprising a body portion having a shoulder, lugs carried by the shoulder and spaced from the wall of the mold and having a series of scores whereby the lugs may be broken off.

6. A feeder for ingot molds comprising a body portion having a shoulder, lugs carried by the shoulder and spaced from the wall of the feeder and said lugs having opposite scores whereby they may be broken off.

7. A feeder for ingot molds comprising a body portion having a shoulder, lugs carried by the shoulder and spaced from the wall of the feeder and said lugs having opposite arranged scores on their outer and inner faces whereby any portion of the lug may be broken off.

8. The combination with an ingot mold, of a feeder extending into the same and having a shoulder and a scored brick arranged between the shoulder and the upper end of the mold.

9. The combination with an ingot mold, of a feeder extending into the same and having a shoulder and bricks arranged on end, edge and sides between the shoulder and upper end of the mold whereby the feeder can be lowered into the mold.

In testimony whereof we affix our signatures.

BLOOMFIELD H. HOWARD
ERNEST J. TURNER.